United States Patent
Cho et al.

(10) Patent No.: US 8,340,463 B1
(45) Date of Patent: Dec. 25, 2012

(54) CANDIDATE PRUNING FOR PATCH TRANSFORMS

(75) Inventors: Taeg Sang Cho, Cambridge, MA (US); Shmuel Avidan, Brookline, MA (US); William T. Freeman, Acton, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1062 days.

(21) Appl. No.: 12/324,319

(22) Filed: Nov. 26, 2008

Related U.S. Application Data

(60) Provisional application No. 61/093,000, filed on Aug. 29, 2008.

(51) Int. Cl.
*G06K 9/36* (2006.01)

(52) U.S. Cl. ............ 382/276; 382/284; 382/162

(58) Field of Classification Search .......... 345/582; 382/162, 173, 232, 284, 298; 703/2; 348/36
See application file for complete search history.

(56) References Cited

U.S. PATENT DOCUMENTS

| | | | | |
|---|---|---|---|---|
| 6,097,854 | A * | 8/2000 | Szeliski et al. | 382/284 |
| 6,263,103 | B1 * | 7/2001 | Freeman et al. | 382/173 |
| 6,910,000 | B1 * | 6/2005 | Yedidia et al. | 703/2 |
| 6,919,903 | B2 * | 7/2005 | Freeman et al. | 345/582 |
| 7,653,261 | B2 * | 1/2010 | Blake et al. | 382/284 |
| 7,747,107 | B2 * | 6/2010 | Avidan et al. | 382/298 |
| 7,899,258 | B2 * | 3/2011 | Liu et al. | 382/232 |
| 2008/0238942 | A1 | 10/2008 | Sun et al. | |
| 2009/0096808 | A1 | 4/2009 | Winn et al. | |
| 2010/0027876 | A1 * | 2/2010 | Avidan et al. | 382/162 |
| 2011/0043604 | A1 * | 2/2011 | Peleg et al. | 348/36 |

OTHER PUBLICATIONS

Cho, T. S., et al., "The patch transform and its applications to image editing," IEEE Conference on Computer Vision and Pattern Recognition, Jun. 23-28, 2008.*
Efros, A., et al., "Image quilting for texture synthesis and transfer," in Proc. SIGGRAPH, 2001.*
Avidan, S., et al., "Seam carving for content-aware image resizing," ACM SIGGRAPH, 2007.*
Cho, T. S., et al., "The patch transform," IEEE Trans. on Pattern Analysis and Machine Intelligence, vol. 32, No. 8, Aug. 2010.*

(Continued)

*Primary Examiner* — Vu Le
*Assistant Examiner* — Xuemei Chen
(74) *Attorney, Agent, or Firm* — Robert C. Kowert; Myertons, Hood, Kivlin, Kowert & Goetzel, P.C.

(57) ABSTRACT

Systems and methods for performing image editing operations may divide an input image into overlapping patches and assign those patches to locations in a reconstructed output image such that visual artifacts are minimized. The methods may use belief propagation to compute a joint probability for the assignment of active patch labels to output image nodes. The computation may include an exclusivity term, steering the solution such that each patch is preferably only used once in the output image. The methods may include a pre-computation of a pruned list of candidate patches for placing next to each patch in the output image, dependent on local evidence (e.g., color, intensity, or user-driven placement) for each patch. The pre-computation may include determining groupings of patches, each forming a highly compatible loop of neighboring patches for a given candidate patch. The methods may be implemented as program instructions executable by a CPU and/or GPU.

33 Claims, 12 Drawing Sheets

OTHER PUBLICATIONS

E. D. Demaine and M. L. Demaine, "Jigsaw puzzles, edge matching, and polyomino packing: Connections and complexity," Graphs and Combinatorics, vol. 23, 2007, 14 pages.

D. Goldberg, C. Malon, and M. Bern, "A global approach to automatic solution of jigsaw puzzles," in Proceedings of Annual, Symposium on Computational Geometry, 2002, 10 pages.

M. G. Chung, M. M. Fleck, and D. A. Forsyth, "Jigsaw puzzle solver using shape and color," in Proceedings of International, Conference on Signal Processing, 1998, 4 pages.

H. C. da Gama Leitao and J. Stolfi, "A multiscale method for the reassembly of two-dimensional fragmented objects," IEEE, Transactions on Pattern Analysis and Machine Intelligence, vol. 24, No. 9, pp. 1239-1251, Sep. 2002.

L. Zhu, Z. Zhou, and D. Hu, "Globally consistent reconstruction of ripped-up documents," IEEE Transactions on Pattern Analysis, and Machine Intelligence, vol. 30, No. 1, pp. 1-13, 2008.

M. Brown and D. Lowe, "Recognising panoramas," in Proceedings of IEEE International Conference on Computer Vision (ICCV), 2003, 8 pages.

Marcelo Bertalmio, Guillermo Sapiro, Vincent Caselles, and Coloma Ballester. 2000. "Image inpainting." In Proceedings of the 27th annual conference on Computer graphics and interactive techniques (SIGGRAPH '00). ACM Press/Addison-Wesley Publishing Co., New York, NY, USA, pp. 417-424.

A. Criminisi, P. P'erez, and K. Toyama, "Region filling and object removal by exemplar-based image inpainting," IEEE Transactions on Image Processing, 2004, 13 pages.

A. A. Efros and T. K. Leung, "Texture synthesis by non-parametric sampling," in Proceedings of IEEE International Conference on Computer Vision (ICCV), 1999, 6 pages.

W. T. Freeman, E. C. Pasztor, and O. T. Carmichael, "Learning low-level vision," International Journal of Computer Vision (IJCV), vol. 40, No. 1, pp. 25-47, 2000.

V. Kwatra, A. Sch"odl, I. Essa, G. Turk, and A. Bobick, "Graphcut textures: image and video synthesis using graph cuts," in ACM Transactions on Graphics (SIGGRAPH), 2003, 10 pages.

N. Komodakis and G. Tziritas, "Image completion using efficient belief propagation via priority scheduling and dynamic pruning," IEEE Transations on Image Processing, vol. 16, No. 11, pp. 2649-2661, Nov. 2007.

U.S. Appl. No. 12/324,274, filed Nov. 26, 2008, all pages.

Winder, S. A., et al., "Learning Local Image Descriptors," IEEE Conference on Computer Vision and Pattern Recognition, Jun. 2007, all pages.

\* cited by examiner

CANDIDATE PRUNING FOR PATCH TRANSFORMS

PRIORITY INFORMATION

This application claims benefit of priority of U.S. Provisional Application Ser. No. 61/093,000 entitled "Candidate Pruning for Patch Transforms" filed Aug. 29, 2008, the content of which is incorporated by reference herein in its entirety.

BACKGROUND

Description of the Related Art

Graphic applications include an ever-increasing number of image editing features, such as various filtering options, image feature relocation operations, and resizing operations (e.g., for cropping, expanding, or reducing an image). A user may want to make various changes to an image, such as changes in the position of objects, or changes to textures. These types of changes can be difficult to make using existing editing tools.

Some previous techniques on image matting and image composition work at a pixel-level accuracy, and have been shown to perform well in extracting foreground layers in images and placing them on a new background. However, these techniques are computationally complex and consume large amounts of both time and resources. In addition, they typically require the user to provide very accurate inputs to drive construction of a new output image.

Patch-based image representations have been introduced in literature in the form of "epitomes" and "jigsaws." In these models, an image is represented by a small source image and a transformation map. While these models can generate an image with overlapping patches from a source image, they are applied primarily for image analysis.

Generating an image from patches (i.e. stitching patches together to synthesize new images, to perform hole filling, image re-organization and/or image retargeting) is closely related to solving jigsaw puzzles. Some types of jigsaw puzzles have been shown to be NP-complete because they can be reduced to the Set Partition Problem. Nevertheless, there has been much work in literature to (approximately) solve the problem, and for jigsaws with discriminative shapes, it can be proven that a polynomial algorithm solves the puzzle. In a shape-based approach, the boundary shape of the jigsaw is used to find valid neighbors. Using this approach, even if valid neighbors can be found using shape, the problem is still NP-complete because finding the correct order of the boundary jigsaws can be reduced to the traveling salesman problem. Other scientific problems have been formulated as solving a jigsaw puzzle as well, including reconstructing a relic from its fragments, fitting a protein with known amino acid sequence to a 3D electron density map, reconstructing a document from its fragments, and reconstructing a speech signal from its scrambles.

SUMMARY

Systems and methods for performing image editing operations may use patch transforms and inverse patch transforms to reconstruct output images from input images such that visual artifacts are minimized. For example, patch transforms may in some embodiments be employed in an image editing operation that includes adding a patch to the image, relocating a patch within the image, removing a patch from the image, filling a hole in the image resulting from relocation of a patch, or filling a hole in the image resulting from removal of a patch. The methods may include dividing an input image into patches (e.g., according to a regular grid) and assigning those patches to locations (nodes) in the reconstructed output image, as described in more detail herein.

The methods may include a pre-computation of a pruned list of candidate patches for placing next to each patch in the reconstructed output image, dependent on local evidence (e.g., color, intensity, or user-driven placement). For example, for each reference patch, a pre-computation may be used to determine and identify a given number of other patches that are most compatible with local evidence associated with the reference patch (e.g., the five candidate patches for which the average intensity of the pixels in the candidate patch best matches that of the reference patch). The local evidence considered in such a pre-computation may include one or more of: a color value dependent on color values of pixels in each patch, an intensity value dependent on intensity values of pixels in each patch, user input indicating a desired location for a given patch in the output image, user input indicating that a given patch is to be removed from the output image, or a value indicating the strength of a particular constraint, in various embodiments.

In some embodiments, some or all of the patches are overlapping patches. In such embodiments, determining a set of candidate patches may include identifying a given number of candidate patches that would be most compatible with a reference patch along a most similar seam if the candidate patches overlapped the reference patch.

The pre-computation of the pruned set of candidate patches may in some embodiments include determination and identification of a given number of groupings of patches for each candidate patch, each of which forms a highly compatible loop of neighboring patches for a given candidate patch. In some embodiments, active labels identifying each of the compatible neighboring patches in each grouping may be stored (e.g., in a linked list) and associated with the corresponding candidate patch. In some embodiments, when performing an image editing operation on an input image, the location of at least some of the patches within the output image may be dependent on these stored active labels.

The methods described herein may employ belief propagation to compute a joint probability for the assignment of active patch labels to output image nodes. For example, belief propagation may be used to determine a solution in which one of the candidate patches is placed adjacent to each reference patch in the output image such that the joint probability of active label assignments is maximized. The computation may include an exclusivity term, which may steer the solution to one in which each patch is preferably only used once in the output image.

The methods described herein may be implemented as program instructions, (e.g., stored on computer-readable storage media) executable by a CPU and/or GPU, in various embodiments. For example, they may be implemented as program instructions that, when executed, implement an image editing application in response to user input. This image editing application may perform image editing operations using inverse patch transforms, thus generating output images that exhibit minimal visual artifacts. The selection of particular image editing operations to be applied to an input image (and/or parameters thereof) may be specified by the user (e.g., through a graphical user interface).

Figure 1A:
FIG. 1A illustrates an input image to a graphics application, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, graphic applications include an ever-increasing number of image editing features, such as various filtering options, image feature relocation operations, and resizing operations (e.g., for cropping, expanding, or reducing an image or individual features thereof). In some embodiments, an image representation called a "patch transform" may allow users to manipulate images in the "patch domain", which may then seed an "inverse patch transform" to synthesize a modified image. The patch transform of an image may in some embodiments be computed by sampling overlapping patches on a regular grid, and representing them as a "bag-of-patches". Possible modifications in the patch domain may include changes in the spatial locations of patches, the size of the output image, or the pool of patches from which an image is reconstructed. The inverse patch transform may in some embodiments be posed as a patch assignment problem on a Markov random field (MRF), in which each patch should be used only once, and neighboring patches should fit to form a plausible image. An approximate solution to the MRF may be found using loopy belief propagation (BP), and may include the application of a patch exclusion constraint. When no modifications are made, the inverse patch transform may be reduced to a transform similar to solving a jigsaw puzzle. In some embodiments, various image editing tasks may leverage the characteristics of the patch transform.

Image editing tasks that leverage the patch transform may be well suited for application to natural images, such as that shown in FIG. 1A. This image looks natural because the scene context is correct. The sky is at the top, the ground is at the bottom, and the arrangement of object meets standard geometrical constraints, such as the perspective projection. In some embodiments, other natural-looking images may be generated using the pixels of this image. For example, if two pixels, one belonging to the grass and the other belonging to the tree leaf, are swapped, and all other pixels remain fixed, the image may still be perceived as natural looking. In some embodiments, characteristic of natural images may be leveraged in making modifications to an image.

For example, to reposition the woman in FIG. 1A, the image of the woman must be selected, it must be moved to a new location, it must be blended into the new location's surroundings, and then the region that it used to occlude must be filled in through texture synthesis and/or image in-painting. Even after these steps, the image might not look right. For example, the pixels over which the image of the woman has been moved are lost, and the image of the woman may not fit well in its new surroundings. In addition, filled-in textures may change the balance of textures from that of the original image, though the user may have preferred that the original balance be maintained.

Figure 1B:
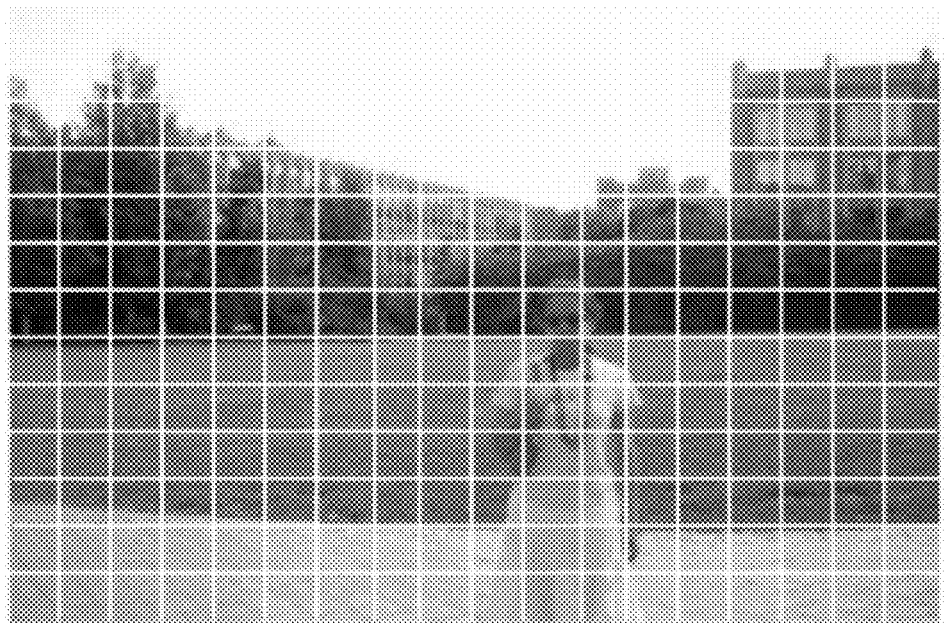
FIG. 1B illustrates an input image divided into patches on a regular grid, according to one embodiment.

In an ideal scenario, a user might be able to "draw" the desired image, with the aid of an editing tool, using all the pixels in the input image only once. The benefit of this approach would be that the problem of changing the balance between textures may be trivially eliminated, and the need for filling in the regions that the foreground object occluded would not exist. Ideally, the user would specify only the desired changes, and would let the editing tool adjust other pixels as to make the entire image as natural as possible. However, such an approach would necessitate that the editing tool be able to assign millions of pixels values to millions of pixel "locations", which could be computationally intractable for large images. In some embodiments, editing operations that make use of a patch transform may strike a balance between flexibility in editing capability and available computational power. In such embodiments, an image may be represented as a set of overlapping patches sampled on a regular grid, and each patch may be treated as an element of the image. For example, for an input image having a size of 736×976 pixels, the size of a patch may 76×76 pixels, with 16 pixels of overlap in all four directions. This would break up the image into 192 patches. FIG. 1B illustrates the scene depicted in FIG. 1A, including a regular grid. Each patch of this image may include the pixels enclosed by one of the grid squares along with a number of pixels overlapping the grid square on all sides. As noted above, the patch representation of an image may be referred to as the patch transform of the image.

Drawing an image from its patch transform may be referred to as the inverse patch transform. Conceptually, the inverse patch transform may be thought of as solving a jigsaw puzzle while conforming to user specified modifications. When no user constraints are specified, the inverse patch transform reduces to solving a jigsaw puzzle. The inverse patch transform may in some embodiments be solved by formulating a Markov random field (MRF) on the patch "slots", and using loopy belief propagation to solve for the patch label at each patch slot.

In various embodiments, the factors that are considered when solving for the inverse patch transform may include: (i) neighboring patches should be compatible to one another so that visible artifacts may be minimized (ii) each patch should be used only once in generating the output image. The compatibility between two overlapping patches may in some embodiments be defined in terms of seam energy, as described herein. To handle the second constraint, named the exclusion constraint, the grid MRF may in some embodiments be augmented with a factor node that steers the solution to use each patch only once.

The patch transform may enable users to manipulate an image in the "patch domain." In various embodiments, users may constrain patch positions, add patches, or remove patches from the image, just as if manipulating pixels. Such a characteristic may give rise to many useful image editing operations. For example, in some embodiments, the user may be able to easily relocate objects in an image by specifying the desired location of certain patches. In another example, the user may be able to easily "retarget" an image by specifying the desired size of the image. Alternatively, the user may be able to modify the amount of texture in an image by adding or removing patches that belong to a particular class (e.g., the sky or clouds). The user may also be able to mix patches from multiple images to generate a collage of those patches, in some embodiments.

As described herein, a patch transform representation may be generated by sampling overlapping patches from the grid, rather than by sampling non-overlapping patches, as in some previous approaches to image reconstruction. The use of overlapping patches may enhance the compatibility measure of the patches and/or reduce visual artifacts in modified images. In some embodiments, the running time of the algorithm may be significantly reduced by pruning the patch candidates at each image node prior to performing an editing operation and/or early in the inference stage.

As previously noted, previous techniques on image matting and image composition work at a pixel-level accuracy, and may perform well in extracting foreground layers in images and placing them on a new background, thus avoiding the tasks of hole filling, image reorganization, or image retargeting. The patch transform approach, on the other hand, inherently works with patch-level accuracy. Therefore, the patch transform approach may not require the user to provide very accurate input, but may adjust the image to the user input so as to make the output image as natural as possible. The patch transform may in some embodiments be used in performing hole filling, image re-organization and/or image retargeting, in addition to accommodating user input, providing a flexible framework for multiple image editing tasks. Using the patch transform, a user may not need to be concerned about the pixels over which an object will be moved, since those underlying patches will "get out of the way" and reposition themselves elsewhere in the image during the image reconstruction step. In various embodiments, a patch transform and/or inverse patch transform may be used in stitching patches together to synthesize new images. In some embodiments, in contrast to typical texture synthesis methods, the patch transform approach may include an exclusivity constraint, i.e., a constraint against multiple uses of a single patch. This may facilitate the controlled rearrangement of an image.

As previously noted, an image editing framework may in some embodiments leverage the patch transform. For example, given an input image, the front end of the system may sample overlapping patches from a regular grid, each with the same size and the same amount of overlap. Once the patches are sampled, the system may compute the compatibility among all possible pairs of patches, and may allow a user to specify desired changes to the input image.

The system may use the inverse patch transform to reconstruct an image, given the user input, by first formulating an MRF, in which nodes represent spatial positions at which the patches will be placed. These nodes may be referred to as "image nodes". The inverse patch transform may run loopy belief propagation on the MRF to solve for patch assignments that are visually pleasing, while satisfying user inputs.

A method for applying a patch transform to image modification may in various embodiments include a pre-processing operation to divide an input image into overlapping patches based on a regular grid and compute the compatibility of various pairs of patches. In some embodiments, the compatibility may be determined by determining the similarity between two patches along a most similar seam of slightly (or heavily) overlapping patches. In this way, image boundaries within patches may be better respected than they would be using an approach that stitches together non-overlapping patches.

The method may also include receiving user input regarding a modification to make on the image (e.g., identifying an object to be moved, a portion of the image to be fixed in place, an object to be removed, etc.). The method may include applying belief propagation to perform an initial reconstruction of the image based on the user input and/or any other local evidence (e.g., the sky is at the top of the image, the grass is at the bottom), and to continue processing the reconstructed image until a visually pleasing result is obtained. Specifically, belief propagation may be used to model the probability of each of the possible assignments of patches to output image nodes. Solving the joint probability equation may then result in the assignment of each patch included in the output image to its respective location in the output image. As described below, in some embodiments the belief propagation equation to be solved may include the product of three terms: a first term specifying local evidence (including user inputs), a second term that represents the similarity of two patches if they are placed next to each other, and a third term (the exclusivity term) that is used to detect and attempt to resolve conflicts between patch assignments.

The method may include, for each image location, a determination of patches that may be suitable for assignment to that location and/or its neighbors. As described in more detail below, each image node (e.g., a reference node) may send messages to its neighbors (e.g., its four nearest neighbors, those on the top, bottom, left, and right of the node) indicating the patches it has determined to be suitable for them (i.e., the labels or identifiers of patches recommended for assignment to the neighbors). Similarly, the neighbor nodes may send messages to the reference node indicating the patch(es) that they have determined may be suitable for placement at the reference node location. The BP algorithm may be applied iteratively to each image node to adjust its recommendations based on the input from its neighbors and vice versa, while taking into account any local evidence for the reference node, until some level of convergence is achieved.

The exclusivity term, described in more detail below, may steer the solution toward one in which each patch is used only once in the output image. For example, in various embodiments, at each time step of the BP iterations (i.e., the message passing), the messages from all of the image nodes may be compared, and conflicts may be detected (e.g., if two image locations have requested the same patch label). The exclusivity term may be used to give preference to the image node with the highest compatibility score, and may assign the competing image nodes a score of zero, thus steering the result so that the patch of interest is only assigned to the most compatible image location and no others. Without such an exclusivity term, the BP algorithm may be steered to a solution that includes any number of duplicates of one or more patches. For example, without such a term, for an input image that includes a blue sky portion, the entire output image may be tiled using patches of blue sky, since these patches would all be compatible with each other, and the local evidence of many of the patches would include blue sky.

Once patches are assigned to image nodes, the patches may be stitched together. In one embodiment, each image node may be visited in a rasterized manner, and at each image node, the assigned patch may be stitched to the blended image thus far by finding the seam that results in minimum artifacts. The stitched image may still contain artifacts due to luminance difference if two adjacent patches were not adjacent in the original image. Thus, the intensity gradients along the seam may be removed if two patches that generated the seam were not adjacent in the original image. In some embodiments, a Poisson solver may be used to generate an image with suppressed seam artifacts. The image model and inverse patch transform are described in more detail below.

In one embodiment, the unknown state at the $i^{th}$ image node may be the index of the patch $x_i$ to be placed at that position. Based on how plausibly one patch fits next to another, a compatibility, $\psi$, may be defined. Each image node may have four neighbors (except at the image boundary). The compatibility between patch k and patch l, placed at neighboring image positions i and j, may be represented as (k, l). In this example, the position subscripts i, j in the function $\psi_{i,j}$ may be used to keep track of which of the four neighbor relationships of j relative to i is being referred to (up, down, left, or right).

In this example, let x be a vector of the unknown patch indices $x_i$ at each of the N image positions i. The probability of an assignment, x, of patches to image positions may be defined as:

$$P(x) \propto \left\{ \prod_i \varphi_i(x_i) \prod_{j \in N(i)} \psi_{ij}(x_i, x_j) \right\} E(x) \qquad (1)$$

A "patch exclusion" function, E(x), in this example, is zero if any two elements of x are the same (i.e., if any patch is used more than once) and is otherwise one. User constraints on patch positions are represented by a local evidence term, $\phi_i(x_i)$, in this example. In some embodiments, the local evidence term may include, for each patch, the mean intensity of the pixels in the patch. In other embodiments, the local evidence term may include other information relative to the patch and/or its context. The term $\phi_i(x_i)$ may also be used to aid the image reconstruction, as described later.

By maximizing P(x), a solution may be realized that matches compatible patches locally, while ensuring that each patch is used only once. As described in more detail below, a message passing scheme may be used to find the patch assignment x that approximately maximizes P(x) in Eq. (1).

Finding the assignment x that maximizes P(x) in the MRF of Eq. (1) is NP-hard, but approximate methods may in some embodiments yield good results. One such method is belief propagation. Belief propagation is an exact inference algorithm for Markov networks without loops, but in some embodiments, it may give good results even in networks with loops. For belief propagation applied in networks with loops, different factorizations of the MRF joint probability may lead to different results. In some embodiments, the patch assignments may be solved using an alternative factorization of Eq. (1) as a directed graph.

To derive a directed graph image model, a normalized compatibility may be defined as:

$$p_{i,j}(x_i \mid x_j) = \frac{\psi_{i,j}(x_i, x_j)}{\sum_{i=1}^{M} \psi_{i,j}(x_i, x_j)} \qquad (2)$$

In this example, the local evidence term may be defined as $p(y_i|x_i)=\phi_i(x_i)$. The joint probability of Eq. (1) in terms of conditional probabilities may be defined as:

$$P(x) \propto \prod_{i=1}^{N} \prod_{j \in N(i)} p(y_i | x_i) p_{i,j}(x_j | x_i) p(x_i) E(x) \quad (3)$$

In this example, $N(i)$ represents the neighboring indices of $x_i$, $y_i$ represents the patch at location i in the original image, and represents the appropriate normalized compatibility determined by the relative location of j with respect to i. In some embodiments, $p(x_i)$ may be manipulated to steer the MRF to favor patches with certain characteristics, while in other embodiments $p(x_i)$ may be modeled as a uniform distribution.

The approximate marginal probability at node i may in some embodiments be computed by iterating the message passing scheme until convergence is achieved. Ignoring the exclusion term $E(x)$, the message update rules for this factorization may be as follows. If j is in the neighborhood of I, then the message from j to i is defined as:

$$\alpha \sum_{x_j} p_{i,j}(x_i | x_j) p(y_j | x_j) \prod_{i \in N(j) \setminus i} m_{ij}(x_j) \quad (4)$$

In this example, the patch assignment at node i may be defined as:

$$\hat{x}_i = \arg\max_l b_i(x_i = l) \quad (5)$$

The belief at node i may be defined as follows:

$$b_i(x_i) = p(y_i | x_i) \prod_{j \in N(i)} m_{ij}(x_i) \quad (6)$$

The message passing scheme described above may fail to reconstruct the original image by using each patch more than once. In some embodiments, a message passing scheme that integrates the exclusion term may be employed, and may favor a solution that seldom uses each patch more than once.

Since the exclusion term is a global function involving all $x_i$, it may be represented as a factor node that is connected to every image node i. The message from the node i to the factor $(m_{if})$ can be shown to be the belief $b_i(x_i)$, as in Eq. (6), and the message from the factor to the node i may be computed as follows:

$$m_{fi}(x_i) = \sum_{\{x_1, \ldots, x_N\} \setminus x_i} \psi_F(x_1, \ldots, x_N) \prod_{t \in S \setminus i} m_{tf}(x_t) \quad (7)$$

In this example, S is the set of all image nodes. If any of the two nodes in S share the same patch, $\psi_F(\cdot)$ is zero, otherwise it is one. The message computation may involve marginalizing N-1 state variables (i.e. the image nodes) that can take on M different values (i.e. the number of patches), so the complexity of the marginalization operation becomes $O(M^{(N-1)})$, which is intractable.

An approximate solution to Eq. (7) may be found, in some embodiments. Instead of marginalizing variables over a joint potential $\psi_F(x_1, \ldots, x_N)$, an approximation of $\psi_F(x_1, \ldots, x_N)$ may be computed as a product of pair-wise exclusion potentials. For computing the message from the exclusion factor node to an image node i, $$\psi_{F_i}(x_1, \ldots, x_N) \approx \prod_{t \in S \setminus i} \psi_{F_t}(x_t | x_i) \quad (8)$$

where $$\psi_{F_t}=(x_j|x_i)=1-\delta(x_j-x_i) \quad (9)$$

The full joint potential $\psi_F(x_1, \ldots, x_N)$ may in some embodiments be zero even if the patch to be placed at node i is not being shared with other image nodes if two other nodes, e.g., u,W∈S, share the same patch. However, the product of pair-wise exclusion potential $\prod_{t \in S \setminus i} \psi_{F_t}(x_t|x_i)$ is zero only if the patch to be assigned to node i has already been used by another image node. Combining Eq. (7-9) results in the following:

$$m_{fi}(x_i = l) \approx \prod_{t \in S \setminus i} \sum_{x_t=1}^{M} \psi_{F_t}(x_t | x_i = l) m_{tf}(x_t) = \prod_{t \in S \setminus i} (1 - m_{tf}(x_t = l)) \quad (10)$$

In this example, it is assumed that $m_{tf}$ is normalized to 1. In other words, the exclusion factor node f tells the node i to place low probability on claiming patch l if patch l has already been claimed by another node with a high probability, and is intuitively satisfying.

In some embodiments, to stabilize BP, the message at iteration t+1 may be damped by taking the geometric mean of the messages at iteration t and t−1.

As previously noted, in previous approaches, patches may be assumed to be non-overlapping and, accordingly, their compatibility is defined in terms of natural image statistics prior. While the compatibility may be reliable in most cases, non-overlapping patches may result in visual artifacts when tiled next to another. By contrast, the patch transform approach described herein may include overlapping patches and may use seams for stitching the patches together. This may in various embodiments results in fewer visual artifacts. Specifically, a compatibility function may be defined that assigns high compatibility to a pair of patches that can be placed next to each other with little or no visible artifacts. In some embodiments, the patches are stitched together along the seam that minimizes visible artifacts, and the seam energy may be used in computing the compatibility function.

Figure 2:
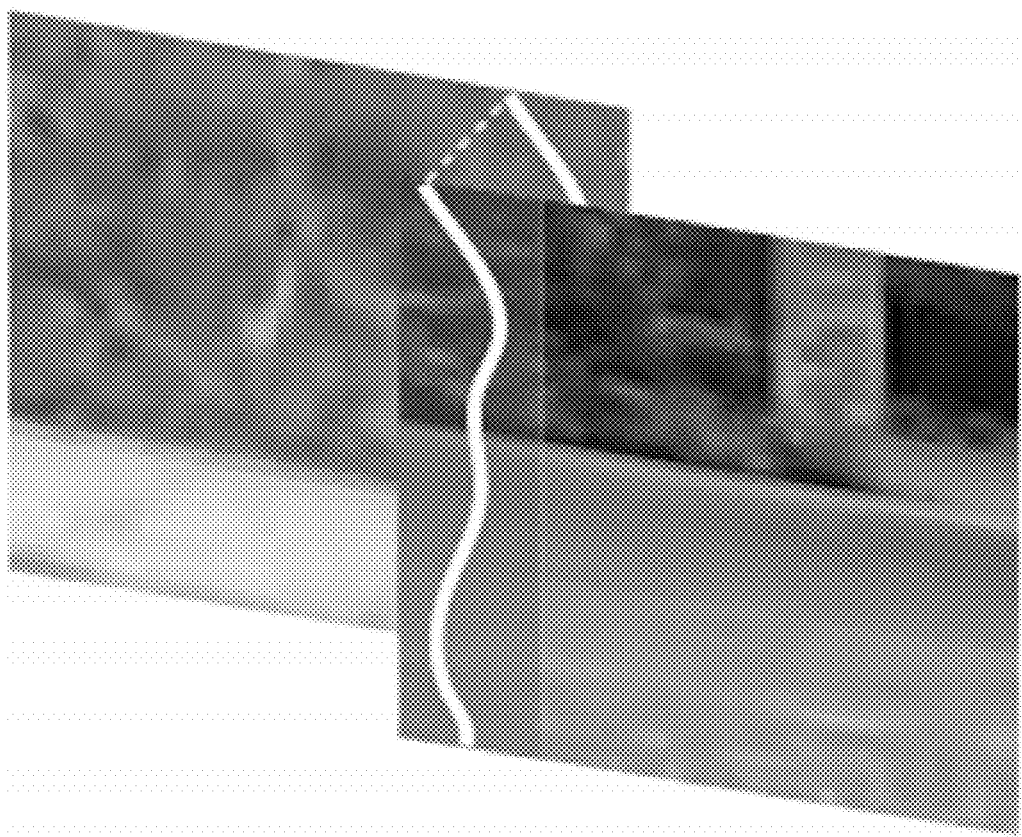
FIG. 2 illustrates a seam between two overlapping patches, according to various embodiments.

FIG. 2 illustrates the computation of the left-right seam energy for two overlapping patches, k and l, according to one embodiment. In this example, the method may include finding the seam, within the overlapped region, along which the color difference between the two patches is minimum. In some embodiments dynamic programming may be used to find the optimal seam. The color difference along the optimal seam may be defined as the seam energy $E_{seam}(k,l)$, which may be exponentiated to compute the compatibility ψ as follows:

$$\psi_{i,j}(k, l) \propto \exp\left(-\frac{E_{seam}(k, l)}{\sigma_c^2}\right) \qquad (11)$$

In this example, $\sigma_c$ is a parameter that controls how much finite seam energy in penalized. One notable characteristic of $E_{seam}$ is that it is zero for two patches that are adjacent in the original image. For any given patch, the compatibility is the highest with the patch that was adjacent to it in the original image. This characteristic allows a greedy polynomial-time algorithm to reconstruct the original image. However, such a greedy algorithm may not generalize well to accommodate image editing operations, as an MRF based algorithm does.

In some embodiments, $\sigma_c$ in Eq. (11) may be the same for all pairs of patches, and may be set by hand. In other embodiments, $\sigma_c$ may be set differently for every patch pair. To determine a, for patch l, for example, $E_{seam}(k,l)$ may be computed for all patches k. In this example, $E^*_{seam}(k,l)$ may be defined as a sorted array of $E_{seam}(k,l)$ along the dimension of k in an ascending manner. Then $\sigma_c$ may be computed for patch l as follows:

$$\sigma_c = E_{seam}*(2) - E_{seam}*(1) \qquad (12)$$

This definition may leave only few patches to be compatible to the reference patch l, as the normalized compatibility $p_{i,j}(k|l)$ is high for only few patches k. This may tend to shape the optimization function (Eq. (1)) to have a wide peak around the maximum.

The computational complexity of the sum-product belief propagation algorithm is O(NMK), where N is the number of image nodes, M is the number of possible patch labels at each image node, and K is the number of possible candidate patches that can be placed next to another patch. If L represents the total number of patches from an image, typically N=M=K=L for all editing applications other than image retargeting (in which case N≦M, K=L), resulting in the complexity of $O(L^3)$ or $O(NL^2)$.

The contribution of the local evidence and the exclusion terms may be described by way of examples that include neither, one, or both of these terms. Without the local evidence or the exclusion term, the belief propagation (BP) will rely solely on the pair-wise compatibilities to reconstruct the original image. Therefore, while the reconstructed image may not look like the original image, BP may do a good job in placing compatible patches next to one another. In other words, while BP may be good at placing compatible patches next to each other, it may not be good at steering the solution to have the same structure as the original image. In this example, the image model with only compatibility terms may have many local maxima. Therefore, each time the BP messages are randomly initialized, BP may end up with a different reconstructed image. In addition, it may take many message passing iterations for the solution to converge.

In an embodiment that includes local evidence, but not the exclusion term, the local evidence may specify where the user wants to locate specified patches. In this example, if a patch l is fixed at node i as a user input, $p(y_i|x_i)$ is 1 for $x_i=l$ and 0 otherwise. To facilitate the image reconstruction, the local evidence term may be shared with the user input. In this example, a low resolution version of the original image may be used to keep the structure of the original image (i.e. place bright patches at the top, green patches in the middle etc.) If the user does not fix any patch at node i, the local evidence at each image node may be defined as:

$$p(y_i | x_i = l) \propto \exp\left(-\frac{(m(y_i) - m(l))^2}{\sigma_e^2}\right) \qquad (13)$$

In this example m(•) may represent the mean color of the argument, and $\sigma_e$ may control how strong a constraint this local evidence term is. Essentially, the local evidence term may ensure that the patch placed at node i has a color similar to the original patch $y_i$. When reconstructing an image with the modified local evidence, the belief propagation algorithm may faithfully reproduce the original image in most parts of the image. The reconstructed image, however, may in some cases contain repeating artifacts. In this example, many of the local minima in the objective function have disappeared with the introduction of the local evidence term. Even with random initialization of messages, belief propagation falls into only few local minima. Additionally, it may take fewer iterations to converge to a solution compared with the case without the local evidence term. In one example, a solution on an image with 192 patches took approximately 100 message updates to converge when it included the local evidence term, as compared to 300 messages for a solution that did not include the local evidence term.

The message passing scheme incorporating the exclusion term has been tested to solve the jigsaw puzzle problem. In many cases, belief propagation can reconstruct the original image, even with random initialization of messages, showing that the image model has a wide peak around the maximum. The number of message passing iterations may in some embodiments be reduced because the factor node essentially provides a short cut for messages to propagate from one end of the image to the other. A notable issue with the exclusion term is that when one patch is only weakly favored over others, the exclusion term may lack the power to suppress the patch reuse. However, for reconstructing the original image, and in the image editing applications described below, the patch reuse rarely causes visual artifacts. In fact, patch reuse is desirable in some applications, such as in object removal and texture manipulation.

Figure 3A:
FIGS. 3A-3D illustrate an image editing operation that uses a patch transform to move an object in an image, according to one embodiment.
Figure 3B:
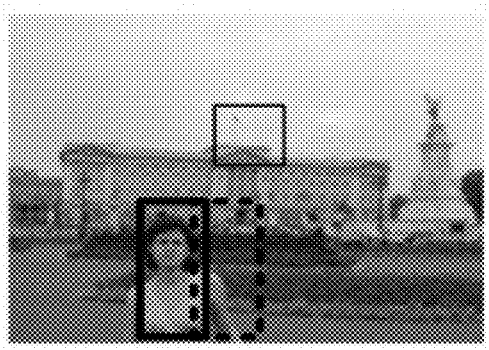

A number of image editing applications may leverage the flexibility of the patch transform, in different embodiments. For example, a user may want to change the location of an object after capturing the picture. An image editing example for relocating a person is illustrated in FIGS. 3A-3D. In this example, FIG. 3A is the original image, and the user wants to move the woman to the center of the image. FIG. 3B illustrates how the user may specify the input, according to one embodiment. In this example, the user grabs (e.g., selects through a GUI operation) patches that belong to the woman (shown as the thick, solid black bounding box), and snaps them to the desired location (shown as the thick dotted bounding box.) The local evidence $p(y_i|x_i)$ in image nodes where the woman used to stand are now uniform over all $x_i$ since the inverse patch transform doesn't know a priori what to place there. In this example, the user has also selected patches to protect (shown as the thin solid black bounding box). These patches will remain fixed during the reconstruction of the image.

Figure 3C:
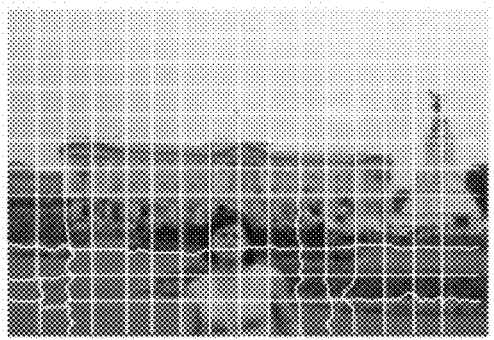
Figure 3D:

With this user input, the inverse patch transform finds the patch configuration, and the reconstructed image. FIG. 3C illustrates the reconstructed image including seams. Note that a straight seam indicates that two patches on either side of it were adjacent in the original image. If two patches were not adjacent in the original image, the algorithm will find the seam that will minimize visible artifacts. The output image, after suppressing any seam artifacts using Poisson blending is shown in FIG. 3D.

Figure 4A:
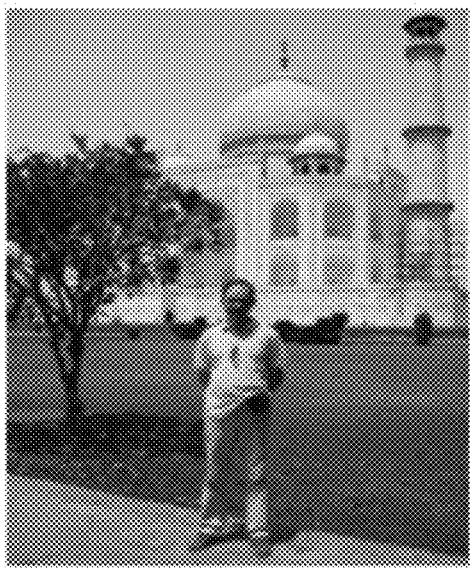
FIGS. 4A-4D illustrate an image editing operation that uses a patch transform to remove an object from an image, according to one embodiment.
Figure 4B:
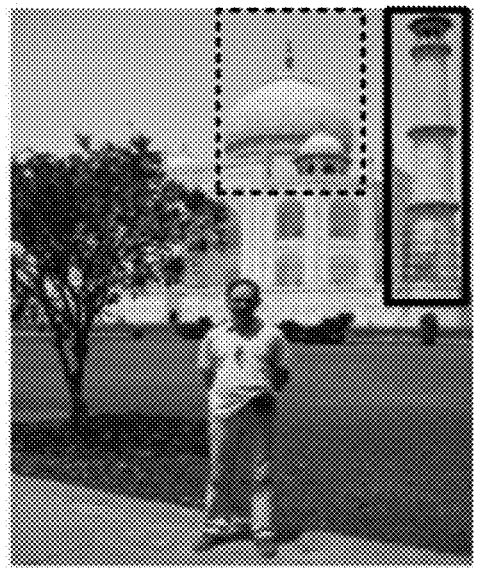
Figure 4C:
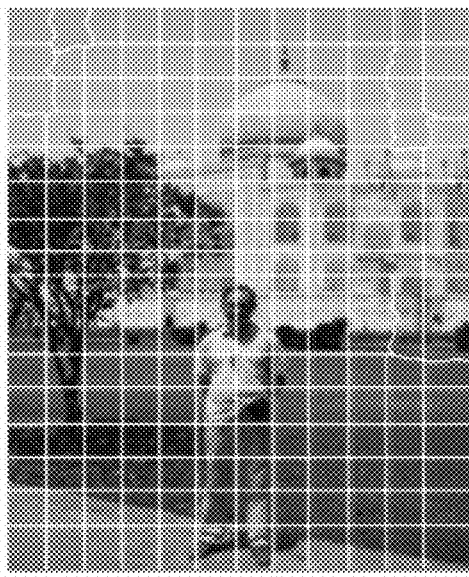
Figure 4D:
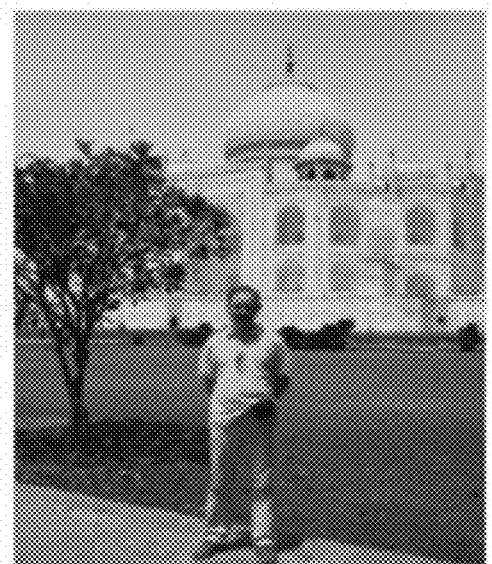

In some embodiments, the patch transform may be used to remove objects, as illustrated in FIGS. 4A-4C. In this example, the user may simply remove patches that belong to the object of interest, and reconstruct the image with the reduced set of patches. Since the exclusion term is not a hard constraint, the inverse patch transform may judiciously reuse some patches. The input image is illustrated in FIG. 4A. In this example, the user wants to remove the long tower under construction (shown as selected using the solid black bounding box in FIG. 4B) while keeping the dome (shown selected using the dotted black bounding box) at its current location. To complete the missing region, the inverse patch transform reuses some patches from the building to propagate it. FIG. 4C illustrates the reconstructed image including seams, and FIG. 4D illustrates the final output image.

A user may be interested in resizing an image while keeping as much content of the original image as possible. One method for retarget an image is "seam carving." In seam carving, the method may find a seam along which the energy is minimum, and may remove the seam from the image. While this method may achieve excellent results on many images, the algorithm is inherently based on low-level cues, and may sometimes fails to retain the overall structure of the image. In some embodiments, the patch transform may allow users to resize an image while keeping the structure of the image through the local evidence term. An image retargeting operation in the patch transform framework may be thought of as solving a jigsaw puzzle on a smaller palette (e.g., leaving some patches unused.) The local evidence on the smaller palette may in some embodiments be the low resolution version of the resized image.

Figure 5A:
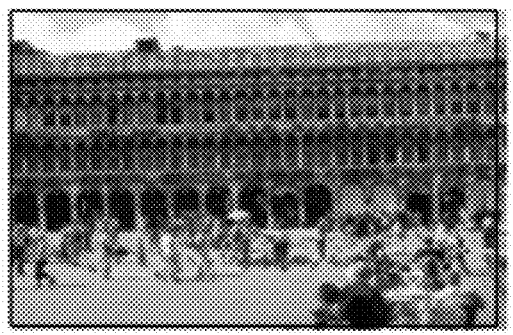
FIGS. 5A-5D illustrate an image editing operation that uses a patch transform to resize an image, according to one embodiment.
Figure 5B:
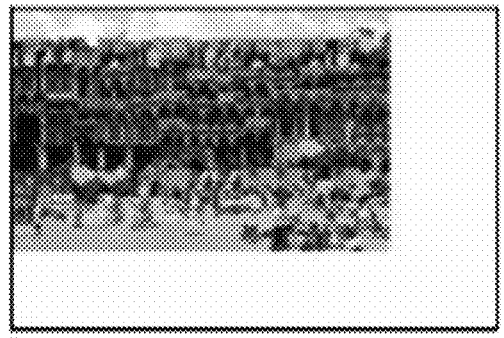
Figure 5C:
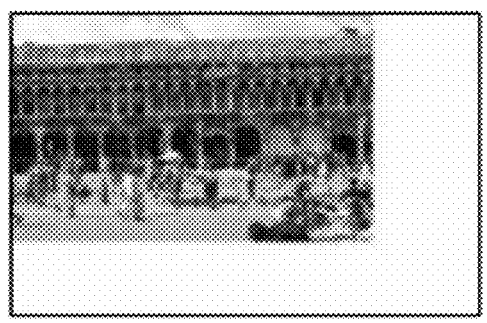
Figure 5D:

In the example illustrated in FIGS. 5A-5D, the user wants to reduce the image size to be 80% of the original height and width. The input image is shown in FIG. 5A. In this example, the patch assignment solely based on the local evidence results in the image shown in FIG. 5B. While the image does not look like the original image, the overall structure of the original image is maintained. After running belief propagation on the smaller palette, the image shown in FIG. 5D may be generated. FIG. 5C (which illustrates the reconstructed image with overlaid seams) may be examined to see which patches have been removed. For example, a whole floor of the building has been removed to fit the vertical size of the image, and some pillars have been removed to fit the lateral size of the image. In addition, some pavement patches as well as some people have disappeared. In some embodiments, retargeting works well in the patch transform framework because while the compatibility term may try to simply crop the original image, the local evidence term may compete against it to retain as much information as possible. The inverse patch transform may balance these competing interests to generate a retargeted image.

The patch transform may also be well suited to controlling the amount of textures, or the patch statistics, in an image. One method of manipulating the patch statistics is through an explicit control of the patches at hand (as described above.) Another method to control the patch statistics may include manipulating $p(x_i)$ in the image model (Eq. (3).)

In one example, an image includes clouds in the sky and the user wants to have more clouds, e.g., clouds similar to those in a given patch $x_s$, in the output image. The patch preference information may be folded into the $p(x_i)$ model as a constant:

$$p(x_i; x_s) \propto \exp\left(-\frac{(f(x_i) - f(x_s))^2}{2\sigma_{sp}^2}\right) \quad (14)$$

In this example, $\sigma_{sp}$ may represent a specificity parameter, and $f(\bullet)$ may represent a function that captures the characteristic of the argument. In one embodiment, $f(\bullet)$ may represent the mean color of the argument, while in other embodiments it may be defined differently for different applications. In the reconstructed image, with $\sigma_{sp}=0.2$, cloud patches may be used multiple times, and the energy penalty paid for using these patches multiple times may be compensated by the energy preference specified by the prior Eq. (14). In another example, the user may favor sky patches. In this case, the inverse patch transform may reconstruct an image primarily with sky regions. In some embodiments, manipulating $p(x_i)$ may introduce a few local minima, so the inverse patch transform may need to be run a few times to find a plausible image. Nevertheless, in these examples, all local minima may include more cloud or sky patches than the original image, respectively.

In some embodiments, a photomontage application may allow a user to mix patches from multiple images to generate a single image. For example, a photographer may find it hard to capture a person and a desired background at the same time at a given shooting position. In this case, the user may take multiple shots using different lenses or zooms, and combine them in the patch domain. For example, to transfer a large mountain from a first image to the background of a second image, the user may specify which portion of the first image should be placed in the background of the second image, and what region(s) should remain fixed in the second image. The inverse patch transform may reconstruct a plausible image using patches from both images.

The inverse patch transform may in various embodiments be insensitive to the exact size of the bounding box. A general guideline for choosing the bounding box size may be dependent on the user's goals. For example, if the user is interested in generating a visually pleasing image in a small number of BP iterations, the user should fix as many patches as possible to the palette. On the other hand, if the user is interested in exploring a large number of possible patch configurations that will meet their constraints, the user should fix as few patches as possible.

In some embodiments, a multi-scale patch transform may address issues of patch misalignment. In such embodiments, reducing the patch size may increase the number of patches, as well as number of image nodes in the MRF. In such embodiments $p(x_i)$ may have more local minima as the number of image nodes increases, and the complexity of belief propagation may increase as the cube of the number of patches. With a multi-scale patch transform, the methods may include completing a first reconstructed image using large patches (i.e., a coarser resolution), and then using this reconstructed image as the local evidence for a patch transform at a finer resolution. Since the first reconstructed image has been completed respecting the user input, the reconstructed image from the coarser scale may be highly trusted at the finer scale, leading to fewer BP iterations at the finer scale.

As previously noted, the complexity of belief propagation algorithm is O(NMK), where N is the number of image nodes, M is the number of patch candidates at a certain image node, and K is the number of possible patches that can be placed next to another. In some embodiments, a method to prune patch candidates may reduce M and K such that their dependence on N is minor. This method may result in a BP algorithm that is sub-quadratic in the number of image nodes. In some embodiments, the method may be used to limit the number of patch candidates at each image nodes (i.e. reducing M).

Various methods have been proposed to reduce the number of labels at each node (M) through the notion of dynamic pruning. In some embodiments, the methods may exploit the fact that K may be reduced such that it is significantly smaller than L. Because is defined as in Eq. (12), for each patch there may only be a few patches that can be placed next to it. Therefore, candidate patch pairs that will never get to be placed next to each other in the output may in some embodiments be pruned out early in the inference stage. In other words, at each image node, only the patches that are consistent with the local evidence are considered, and for each of those patches, the algorithm may determine the patches compatible with them to populate nearby neighbors. This approach may lead to a reduction in the complexity of the reconstruction algorithm to $O(L^2K)$, where K may be much smaller than the total number of patches. This naive label pruning method may not work well in practice, however. For example, as BP progresses, the algorithm may encounter a situation in which no image node agrees with its neighbors, leading to starvation of the algorithm.

Figure 6A:
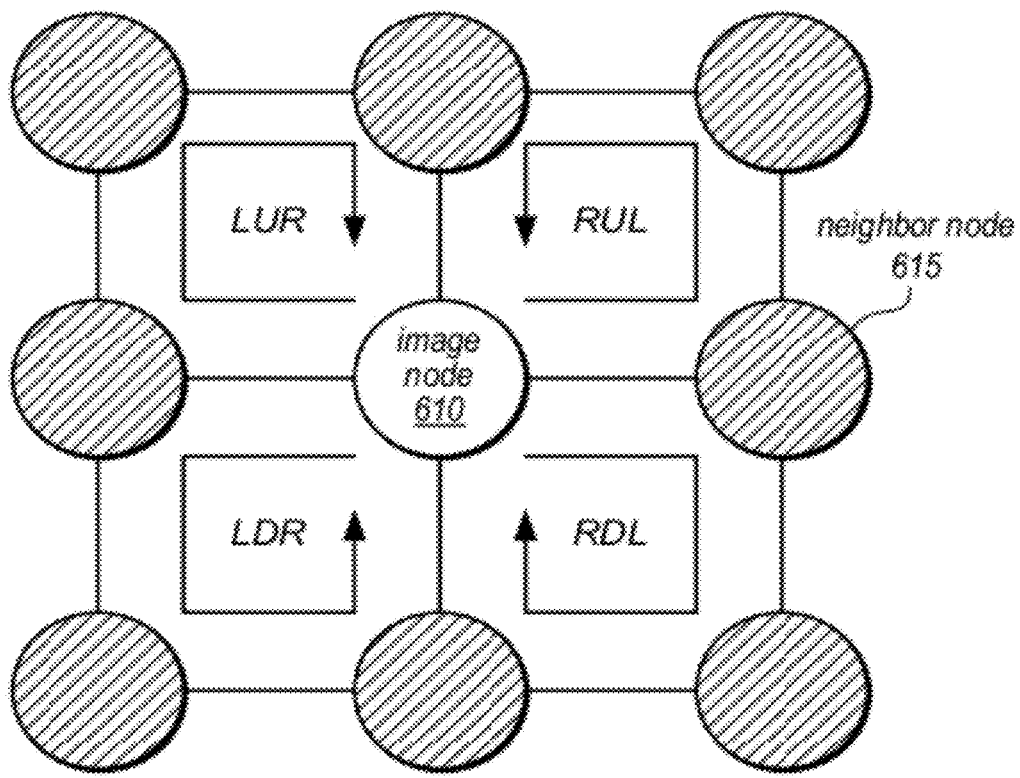
FIG. 6A illustrates four patch loops that may be computed for a candidate patch, according to one embodiment.

In some embodiments, for every patch candidate at a given node, the methods described herein may make sure that there are patches in the neighboring nodes of the candidates that form highly compatible loops. For example, in one embodiment, the method may include pre-computing, for each patch, three other patches that would form compatible loops. The methods may, in general, be used to find the h best patch loops given a fixed reference patch u that minimize the seam energy as the loop is traversed. As shown in FIG. 6A, four different types of loops may be formed given a reference patch u (fixed at image node 610 in FIG. 6A), ignoring the directionality. In this example, the loops are referred to as LUR, LDR, RUL, RDL, based on the order in which the loop is traversed (e.g., left-up-right, left-down-right, etc). Each loop includes three of the neighbor nodes 615 of image node 610.

Figure 6B:
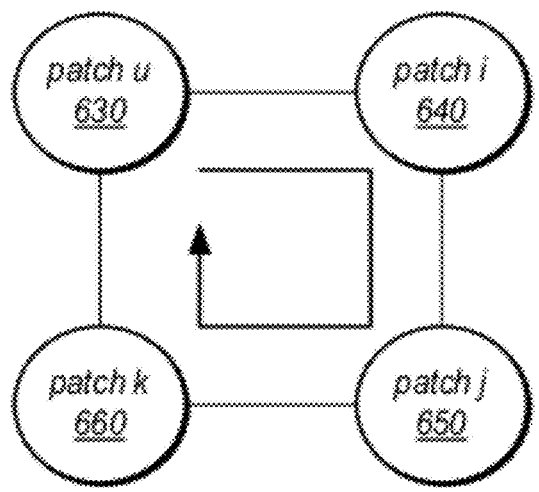
FIG. 6B illustrates one patch loop for a given reference patch, according to one embodiment.

FIG. 6B illustrates the right bottom loop (RDL) of the example illustrated in FIG. 6A. FIG. 6B illustrates the reference patch u (at 630), and other patches i, j and k (shown as 640, 650, and 660, respectively) in clock-wise order. In this example, the seam energy to place $\zeta$ to the left of $\eta$ may be defined as $cH(\zeta,\eta)$, and the seam energy to place $\zeta$ to the top of $\eta$ may be defined as $cV(\zeta,\eta)$.

The following algorithm based on dynamic programming solves for the patches i*, j*, and k* that minimize the seam energy across the loop:

$$E_i(j) = \min_i(cH(u, i) + cV(i, j)) \quad (15)$$

$$E_j(k) = \min_j E_i(j) + cH(k, j) + cV(u, k)$$

$$k^* = \arg\min_k(E_j(k))$$

$$j^* = \arg\min_j(E_j(k^*))$$

$$i^* = \arg\min_i(E_i(j^*))$$

In some embodiments, the h best patches k*, and h loops with the corresponding k*, may be found through back tracing. While the example algorithm described above is directed to finding h best loops for the right-bottom loop (the RDL loop), it may be applicable for all other loops with minor modifications.

As previously noted, naïve pruning of patch labels may be performed by selecting g most probable patches, according to local evidence. These g most probable patches may be the active labels at that node. This pruning scheme may cause problems for belief propagation because for every node, there should be at least one active label that its four neighboring nodes can agree on. As noted above, this may not always be the case. The problem may get worse when the user starts to move patches around. In that case, nodes that neighbor a patch fixed by a user should have at least one active label that is compatible with the user fixed patch, but might not. Another label pruning strategy may be to prune the patch labels at run-time by only retaining patch labels with probability greater than a certain threshold. This, however, may have the same problem as the label pruning based on the local evidence, and the algorithm maybe prohibitively slow before any label pruning happens.

In some embodiments, a method may prune patch labels at each image node using patch loops, as described above. This label pruning routine may serve in a preprocessing capacity on the image nodes, with the active labels fixed at run time. For an image node, the algorithm may first take g most probable patches (as per local evidence), and may add those g patches as the active label at that particular node. For each of those g patches, the algorithm may find the h best patch loops around the neighboring nodes, and may add patches that form the h best patch loops to those nodes. In the case of RDL loop illustrated in FIG. 6B, for example, if the g patches have been assigned as active labels at node 610 (corresponding to patch u, 630), the algorithm may add patches i, j, and k for each of the h best patch loops to the corresponding node in the order in which they form the loop. Ideally, this operation may be performed for every active label at a node. However, once patches are assigned to i based on the loop around u, the number of active labels at i will be greater than g, the number of active labels from the local evidence. Ideally, for every active label at i, patches would need to be assigned to nodes u, j, and k with the patch loops around i, which would increase the number of active labels at u. In addition, for newly added patches at u, active labels would need to be assigned at i based on the loop around new patches at u and so on. This may lead to an explosion in the number of active labels at all the image nodes. Therefore, in some embodiments, an approximation to the ideal active label assignments may be used, which may include a two-pass algorithm across the image nodes, as described in more detail below.

Figure 7:
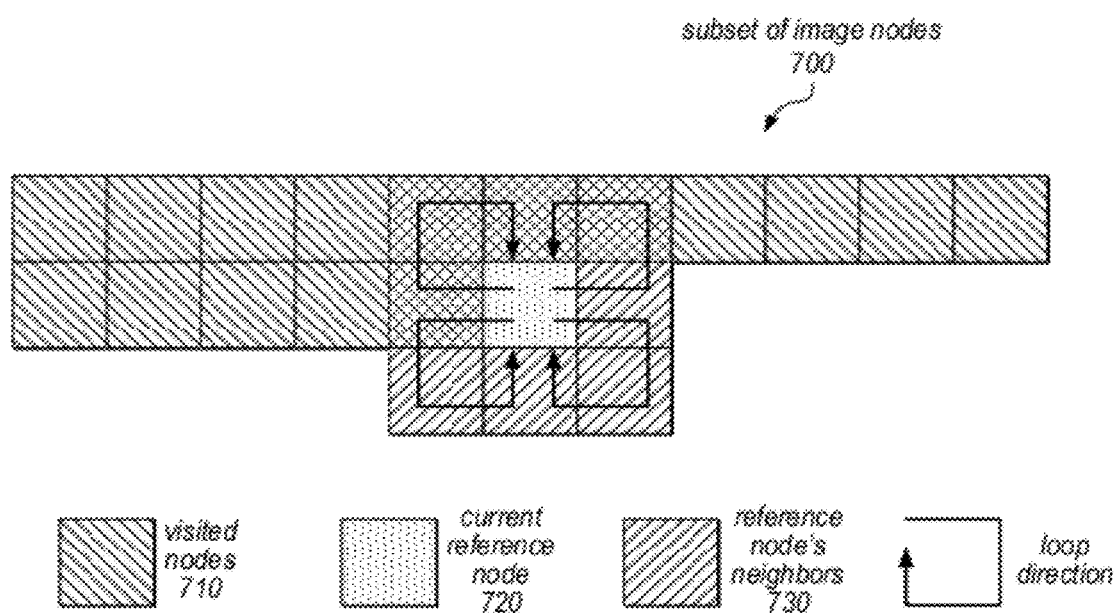
FIG. 7 illustrates a method of scanning image nodes to compute active labels, according to one embodiment.

In some embodiments, active labels may be assigned to image nodes by scanning the image nodes across the image (e.g., from the top-left corner to the bottom-right corner of the image). As shown in the example subset of image nodes 700 illustrated in FIG. 7, at each node (e.g., current reference node 720), the method may add g active labels as per the local evidence, compute h best patch loops using each of the g active labels, and add patches at the corresponding locations in the neighboring nodes (shown as 730). In this process, the active labels added by their neighboring nodes (neighboring nodes shown as visited nodes 710, but not as neighbor nodes 730) may not be added to the current node (reference node 720) in order to avoid active label explosions. In some embodiments, output image degradation through this operation may be negligible.

Figure 8:
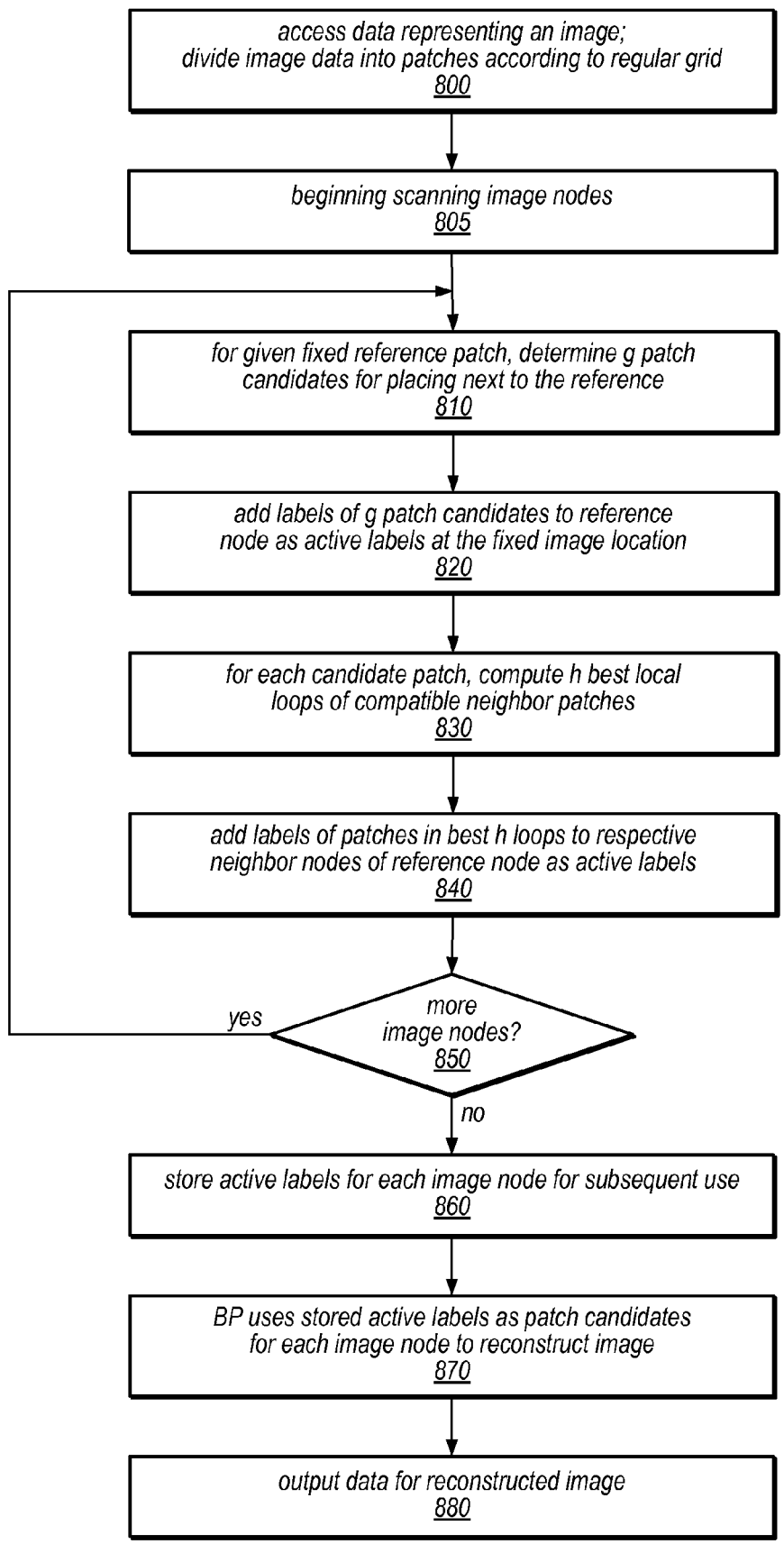
FIG. 8 is a flow diagram illustrating a method for pre-computing a pruned list of active labels for image nodes, according to one embodiment.

One method for pruning candidate nodes, as described herein, is illustrated in FIG. 8. In this example, data representing an image may be accessed and divided into patches according to a regular grid, as in 800. As described herein, the patches may be overlapping and may all be the same size, in some embodiments. The method may begin scanning image nodes, as in 805. In some embodiments, image nodes may be scanned in a pre-determined order, such as from top-left to bottom right. The method may include, for a given fixed reference patch (e.g., a patch at the current image node), determining g patch candidates for placing next to the reference patch, as in 810. As described above, these g patch candidates may be determined based on local evidence (including, in some cases, color and/or intensity values of the patch pixels, user modifications, etc.). The labels of the g patch candidates may be added to the reference node as active labels at the fixed location, as in 820.

In this example, the method may include, for each candidate patch, computing h best local loops of compatible neighbor patches, as described above. This is shown as 830 in FIG. The labels of the patches in the best h loops may be added to the respective neighbor nodes of the reference node as active labels of those neighbor nodes, as in 840. In this example, the method may include repeating the operations illustrated in 810-840 for all of the nodes of the image. This is shown as the feedback loop from the positive exit of 850 to 810.

When there are no more image nodes to scan, shown as the negative exit from 850, the active labels for each image node may be stored for subsequent use, as in 860. For example, belief propagation may use the stored list of active labels as patch candidates for each image node in a reconstruction operation, as in 870. The method may then include outputting data representing the reconstructed image, as in 880. For example, the data may be provided to a display component of the image editing application for display of the refined output image to the user and/or the data may be stored as in intermediate image by the image editing application for further processing by the application (or another application) or as a final image (e.g., written to main memory, a file, an archive, etc.).

Figure 9:
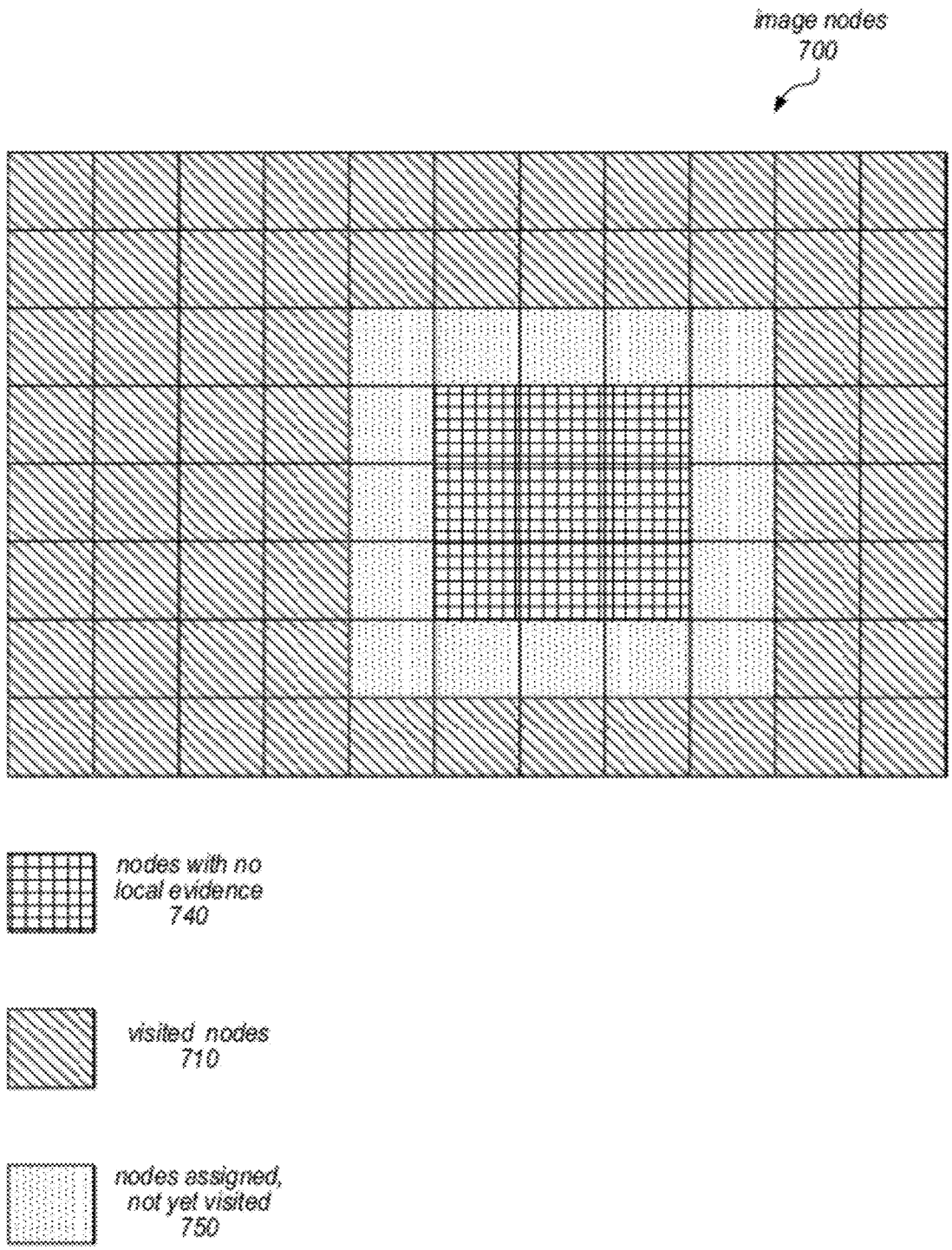
FIG. 9 illustrates a set of image nodes, some of which have no local evidence, according to one embodiment.

The active label assignment algorithm described above relies heavily on the use of local evidence. However, when a user removes patches, the local evidence may be essentially uniform for all patches at those image nodes. In this case, the two-pass algorithm may step over the region with uniform local evidence. For example, after the active label assignment step, the region from which the patch was removed may be characterized into two parts: those nodes with active labels assigned by neighboring valid nodes, and those nodes with no active labels. FIG. 9 illustrates image nodes 700 of an image, some of which have been visited by the active label assignment algorithm, shown as visited nodes 710. Other nodes, shown as 740, may represent nodes with no local evidence (or no valid local evidence), such as image nodes at which a patch has been removed, as described above. Still other nodes, shown as 750, may represent nodes assigned, but not yet visited.

In some embodiments, the active labels from patches on the boundary of the region may be propagated into the core of the region. In one such embodiment, the region from which the patch was removed may be scanned from the top-left corner to the bottom-right corner using RDL loops, and reverse-scanned from the bottom-right corner to the top-left corner using LUR loops. The difference when applying the two-pass algorithm for nodes with valid local evidence may be that, in some embodiments, every active label at a node, not just g active labels from the local evidence, may participate in propagating the active labels. Thus, at a given node, for every active label, h* patch loops may be computed (where h* may be different from h), and the active labels assigned to the neighboring nodes. In practice, an algorithm in which h*=1 may perform well.

Figure 10:
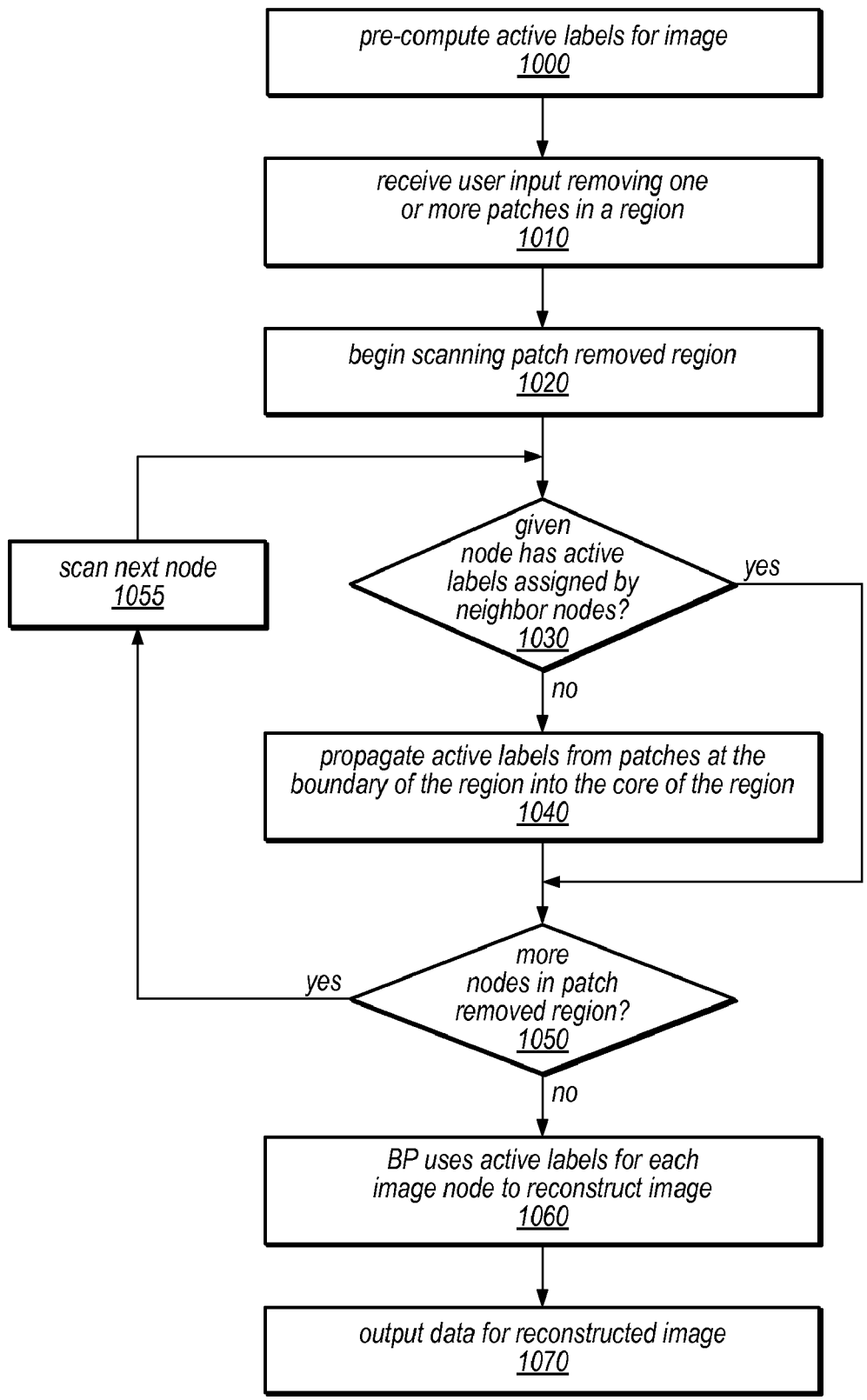
FIG. 10 is a flow diagram illustrating a method for determining active labels following removal of one or more patches of an image, according to one embodiment.

One method for computing active labels when a user removes patches from an image is illustrated in FIG. 10. In this example, active labels may be pre-computed for an image, as described above. This is shown at 1000 in FIG. 10. In this example, user input may be received identifying one or more patches in a region of the image to be removed, as in 1010. The method may include scanning the region from which the patch was removed, as in 1020. For each given node in the region, the method may include determining if the node has active label assigned by its neighbors, as in 1030. If not, shown as the negative exit from 1030, the method may include propagating active labels from patches at the boundary of the region into the core of the region, as in 1040. For example, each boundary patch may use loops, as described above, to populate the active labels of an image node located one patch node inside the empty region. The method may apply this operation (e.g., computing loops for the nodes just inside the region) to populate the next layer of nodes toward the center of the region, when these nodes are encountered in the scan.

Figure 11:
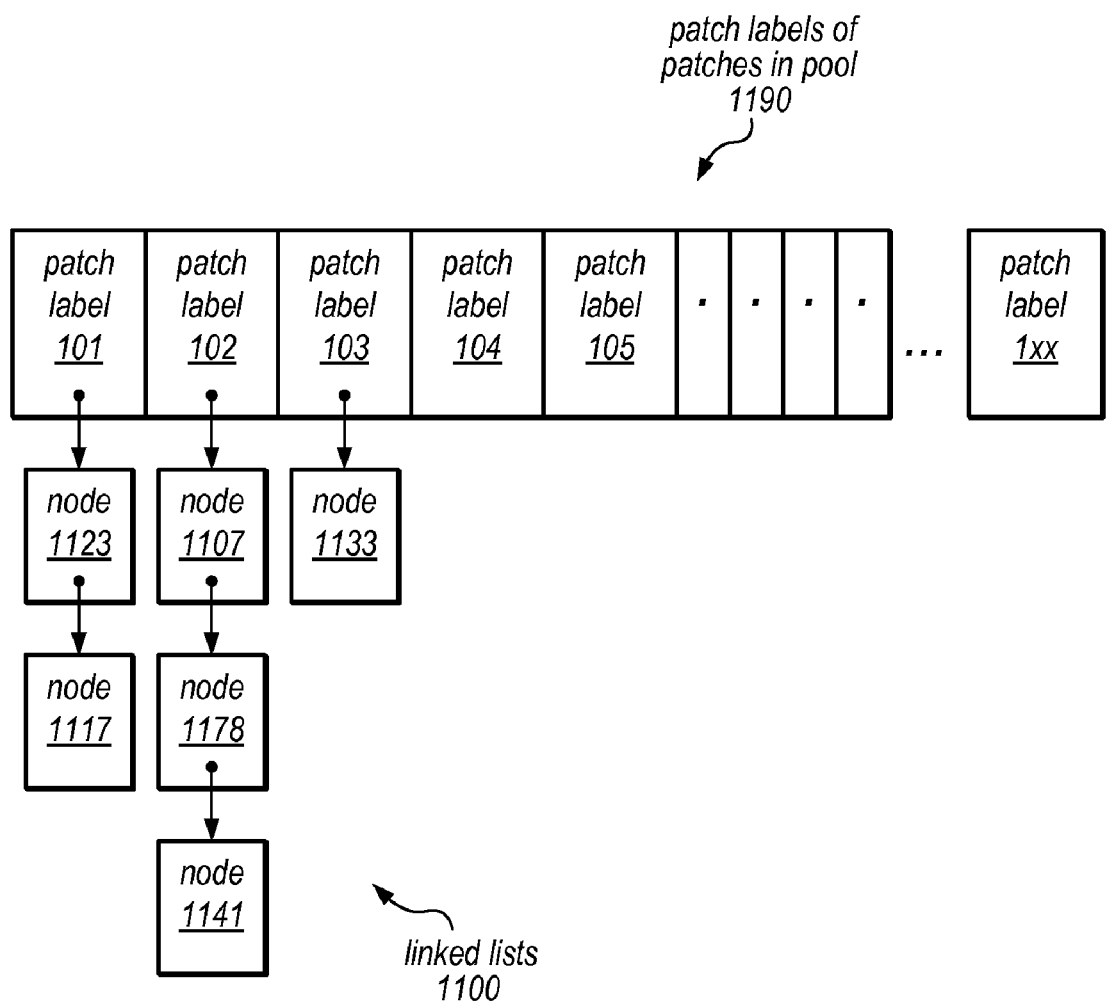
FIG. 11 illustrates a data structure configured to associate active labels with image nodes, according to one embodiment.

In the example illustrated in FIG. 11, if the currently scanned node has active labels, shown as the positive exit from 1030, the method may determine if there are more nodes to be scanned in the patch removed region. If so, these operations may be repeated until all the nodes in the region are populated. This is shown as the feedback from the positive exit of 1050 to 1055, and then to 1030, in FIG. 10. Once there are no more nodes in the patch removed region to be scanned, shown as the negative exit from 1050, the method may include belief propagation using the active labels determined for each node in the reconstruction of an image, as in 1060. The method may then include outputting data representing the reconstructed image, as in 1070. For example, the data may be provided to a display component of the image editing application for display of the refined output image to the user and/or the data may be stored as in intermediate image by the image editing application for further processing by the application (or another application) or as a final image (e.g., written to main memory, a file, an archive, etc.).

As described above, a message passing scheme that includes an exclusivity term may be used to steer the solution such that each patch is seldom used more than once. The messages from the image nodes to the factor node, and the factor node to the image node are defined as follows:

$$m_{fi}(x_i = l) \approx \prod_{t \in S \setminus i} \sum_{x_t=1}^{M} \psi_{F_t}(x_t \mid x_i) = l) m_{tf}(x_t) = \prod_{t \in S \setminus i}(1 - m_{tf}(x_t = l)) \quad (16)$$

$$m_{tf}(x_t) = p(y_t \mid x_t) \prod_{j \in N(t)} m_{jt}(x_t) \quad (17)$$

When using the label pruning preprocessing described herein, the algorithm may not need to compute $m_{fi}(x_i,l)$ for all patches l, but only for its active labels.

In some embodiments, various data structures may be configured for keeping track of active labels for each node and/or other information used by the methods described here. For example, FIG. 11 illustrates one data structure that may allow efficient computation of the message from the exclusion factor node to the image nodes. For each of the patch in pool 1190 (represented in FIG. 11 by their patch labels 101-1xx) all image nodes that have the particular patch as one of their active labels may be found and added to a linked list 1100 for the corresponding patch label. For example, the linked list for patch 1 (represented by patch label 101) includes nodes 1123 and 1117; the linked list for patch 2 (represented by patch label 102) includes nodes 1107, 1178, and 1141; and the linked list for patch 3 (represented as patch label 103) includes node 1133. In this example, each element of a linked list 1100 has $m_{rf}(x_r=l)$, where l is the patch number. Such a data structure may in some embodiments allow each image node to keep track of the index of the linked list at which its message lies. In this example, when computing $m_{fi}(x_i=l)$, each image node may multiply all the linked list elements for patch l except for that of its own.

In experiments performed using the methods described herein, candidate patch label pruning has been shown to provide benefits in terms of reducing the time per message passing iteration and in terms of reducing the number of message passing iterations needed to generate a converged solution. In one type of experiment, run-time comparisons of an image reconstruction task were made by breaking an image into 192, 432, 768, 1200, and 1728 patches. The time it took to run 50 iterations of belief propagation with these patches with and without the patch loop based label pruning were compared. The number of patch loops, h, was 4, and the number of active label candidates from the local evidence, g, was 4 in these experiments. The number of patch loops for nodes without valid local evidence, h*, was 1. Belief propagation including patch loop based label pruning was at least two orders of magnitude faster than with it, in these experiments. In addition, recording the average number of active labels at nodes with and without local evidence showed that in both the nodes with and without local evidence, the number of active labels increased roughly linearly to the number of patches. For the case of nodes with local evidence, the proportionality constant was roughly 0.01, and for the case of nodes without local evidence, the proportionality constant was roughly 0.3. This suggests that the bulk of the reconstruction time may be spent on conducting message passing in regions without local evidence.

Additional comparisons of image quality (for images with different numbers of patches) after a given number of BP iterations (e.g., 50) were also performed. These experiments showed, for example, that 50 message passing iterations may be enough, even with 1728 patches, to reconstruct a plausible image when label pruning is incorporated, but may not be enough to reconstruct a plausible image without label pruning. These experiments also demonstrated that with the use of smaller patches, the number of artifacts due to patch misalignment may in some embodiments be reduced. It was also demonstrated that artifacts due to patch repetition (which may be introduced when the number of message passing iterations is not enough) were minor in all of the examples.

Experiments in which the number of local patch candidates g and the number of patch loops h per candidate were swept demonstrated that small g and h may in some embodiments generate pleasant looking output images. If g and h are too small, however, the output images may become too rigid. In other words, in these cases patches do not want to move from their original positions. However, once g and h are near g=4, h=4, the algorithm may generate a pleasant image. Another observation was that it took longer for the algorithm to converge as g and h were increased. This may be as expected since, for each node, when there are many patches to consider, the algorithm may find it hard to make the decision quickly. In these experiments, artifacts began to be introduced as g was increased beyond 10.

Figure 12:
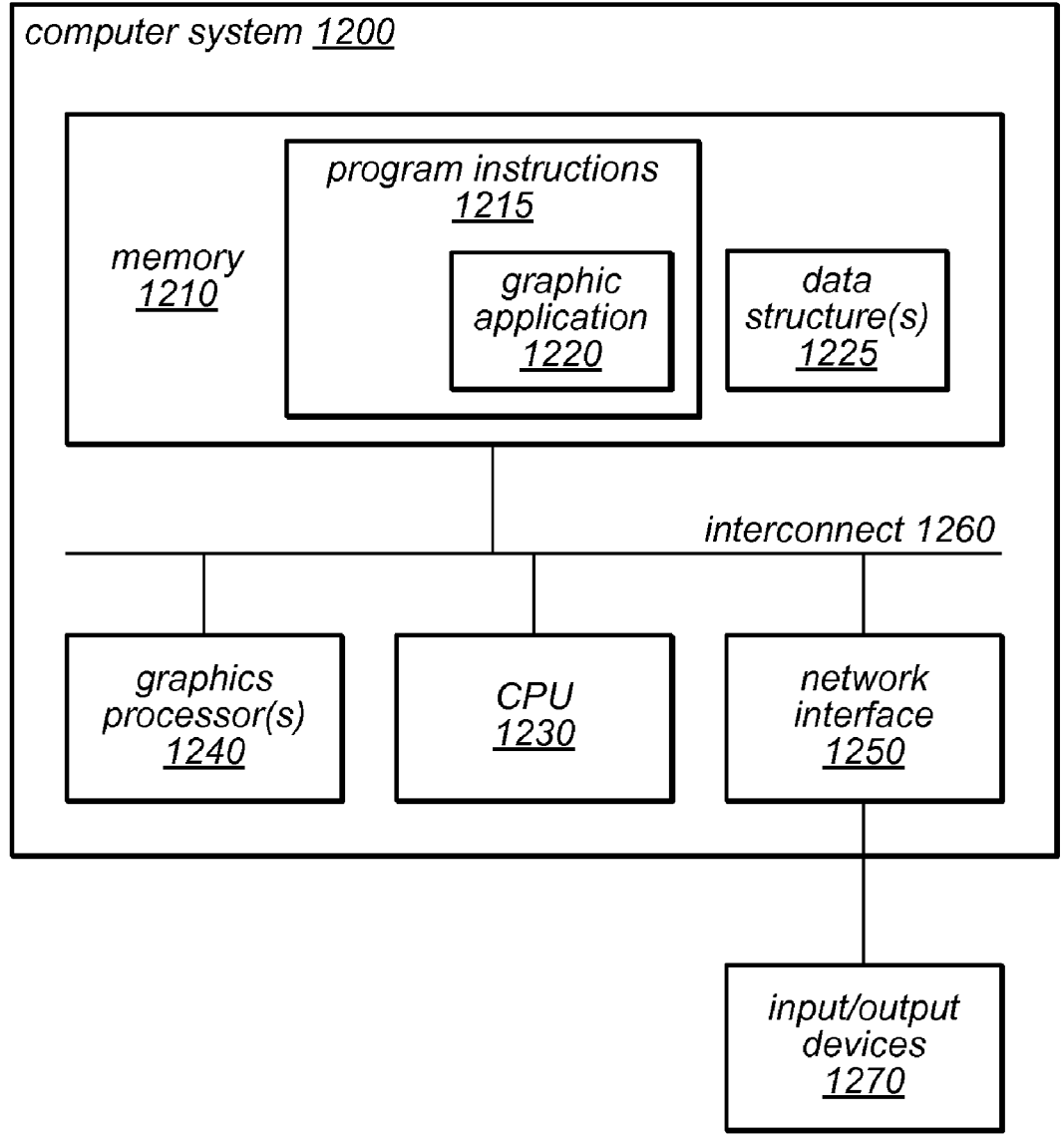
FIG. 12 illustrates a computer system configured for implementing editing of input images using patch transforms and/or pre-computing pruned candidate patch lists, according to one embodiment.

The methods described herein for loop based pruning of patch candidates in image editing operations (e.g., within a graphics application) may be implemented by a computer system configured to provide the functionality described. FIG. 12 is a block diagram illustrating one embodiment of a computer system 1200 configured to implement such image editing operations. A graphics application such as graphics application 1220 may be configured to perform various image editing functions and to render new images accordingly. In some embodiments, a user may invoke operations to move or remove objects, resize objects or entire images, or otherwise alter an input image through a user interface of graphics application 1220. Graphics application 1220 may be configured to perform these operations using patch transforms, according to various embodiments, and may employ the methods described herein for pruning the candidate patch lists for the image nodes. Graphics application 1220 may be configured to render the reconstructed image to a separate window, or directly into the same frame buffer containing the input image, in different embodiments.

Graphics application 1220 may represent various types of graphics applications, such as painting, publishing, photography, games, animation, and other applications. Additionally, graphics application 1220 may utilize a graphics processor 1240 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1240 may implement a number of graphics primitive operations in a way that makes executing them much faster than drawing directly to the screen with a host central processing unit (CPU), such as CPU 1230. In various embodiments, the methods disclosed herein for may be implemented by program instructions configured for parallel execution on two or more such GPUs. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, graphics application 1220 may, in some embodiments, be part of, or performed by, one or more graphics processors, such as graphics processor 1240. As described above, in some embodiments graphics application 1220 may be configured to render modified and/or reconstructed images into a different window than input images.

Editing of images using patch transforms, as described herein, may be implemented on various types of computer systems. Referring again to FIG. 12, computer system 1200 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1220, which may be configured to implement loop based pruning of patch candidates and/or image operations using patch transforms, as described herein, may be provided as a computer program product, or software, that may include a computer-readable storage medium having stored thereon instructions, which may be used to program a computer system (or other electronic devices) to implement image editing using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 12, computer system 1200 may include one or more processor units (CPUs) 1230. Processors 1230 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1200, such as various versions of Unix, Linux, Windows™ from Microsoft Corporation, MacOS™ from Apple Corporation, or any other operating system that enables the operation of software on a hardware platform.

The computer system 1200 may also include one or more system memories 1210 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1200 via interconnect 1260. Memory 1210 may include other types of memory as well, or combinations thereof. One or more of memories 1210 may include program instructions 1215 executable by one or more of processors 1230 to implement aspects of the image editing techniques described herein. Program instructions 1215, which may include program instructions configured to implement graphics application 1220, may be partly or fully resident within the memory 1210 of computer system 1200 at any point in time. Alternatively, program instructions 1215 may be provided to GPU 1240 for performing image editing operations (or portions thereof) on GPU 1240 using one or more of the techniques described herein. In some embodiments, the techniques described herein may be implemented by a combination of program instructions 1215 executed on one or more processors 1230 and one or more GPUs 1240, respectively. Program instructions 1215 may also be stored on an external storage device (not shown) accessible by the processor(s) 1230 and/or GPU 1240, in some embodiments. Any of a variety of such storage devices may be used to store the program instructions 1215 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1230 and/or GPU 1240 through one or more storage or I/O interfaces including, but not limited to, interconnect 1260 or network interface 1250, as described herein.

In some embodiments, the program instructions 1215 may be provided to the computer system 1200 via any suitable computer-readable storage medium including memory 1210 and/or external storage devices described above. Memory 1210 may also be configured to implement one or more data structures 1225, such as one or more data structures for tracking lists of active labels for image nodes and/or structures configured to store data representing one or more input images, output images, or intermediate images. Data structures 1225 may be accessible by processor(s) 1230 and/or GPU 1240 when executing graphics application 1220 or other program instructions 1215.

As shown in FIG. 12, processor(s) 1230 may be coupled to one or more of the other illustrated components by at least one communications bus, such as interconnect 1260 (e.g., a system bus, LDT, PCI, ISA, or other communication bus type), and a network interface 1250 (e.g., an ATM interface, an Ethernet interface, a Frame Relay interface, or other interface). The CPU 1230, the network interface 1250, and the memory 1210 may be coupled to the interconnect 1260. It should also be noted that one or more components of system 1200 might be located remotely and accessed via a network.

As noted above, in some embodiments, memory 1210 may include program instructions 1215, comprising program instructions configured to implement graphics application 1220, as described herein. Graphics application 1220 may be implemented in various embodiments using any desired programming language, scripting language, or combination of programming languages and/or scripting languages, e.g., C, C++, C#, Java™, Perl, etc. For example, in one embodiment, graphics application 1220 may be JAVA based, while in another embodiments, it may be implemented using the C or C++ programming languages. In other embodiments, graphics application 1220 may be implemented using specific graphic languages specifically for developing programs executed by specialize graphics hardware, such as GPU 1240. In addition, graphics application 1220 may be embodied on memory specifically allocated for use by graphics processor(s) 1240, such as memory on a graphics board including graphics processor(s) 1240. Thus, memory 1210 may represent dedicated graphics memory as well as general-purpose system RAM, in various embodiments. Memory 1210 may in some embodiments also include a data store configured to store image data for one or more input images and/or output images, in various embodiments. Other information not described herein may be included in memory 1210 and may be used to implement the methods described herein and/or other functionality of computer system 1200.

Network interface 1250 may be configured to enable computer system 1200 to communicate with other computers, systems or machines, such as across a network. Network interface 1250 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1200 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1250 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1240 may be implemented in a number of different physical forms. For example, GPU 1240 may take the form of a dedicated graphics card, an integrated graphics solution and/or a hybrid solution. GPU 1240 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 12, memory 1210 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1240 and the rest of the computer system 1200 may travel through a graphics card slot or other interface, such as interconnect 1260 of FIG. 12.

Computer system 1200 may also include one or more additional I/O interfaces, such as interfaces for one or more user input devices 1270, or such devices may be coupled to computer system 1200 via network interface 1250. For example, computer system 1200 may include interfaces to a keyboard, a mouse or other cursor control device, a joystick, or other user input devices 1270, in various embodiments. Additionally, the computer system 1200 may include one or more displays (not shown), coupled to processors 1230 and/or other components via interconnect 1260 or network interface 1250. Such input/output devices may be configured to allow a user to interact with graphics application 1220 to request or invoke various image editing operations and/or to specify various parameters, thresholds, and/or other configurable options available to the user when editing images while executing graphic application 1220. It will be apparent to those having ordinary skill in the art that computer system 1200 may also include numerous other elements not shown in FIG. 12.

Note that program instructions 1215 may be configured to implement a graphic application 1220 as a stand-alone application, or as a module of another graphics application or graphics library, in various embodiments. For example, in one embodiment program instructions 1215 may be configured to implement graphics applications such as painting, publishing, photography, games, animation, and/or other applications, and may be configured to edit images as part of one or more of these graphics applications. In another embodiment, program instructions 1215 may be configured to implement the image editing techniques described herein in one or more functions called by another graphics application executed on GPU 1240 and/or processor(s) 1230. Program instructions 1215 may also be configured to render images and present them on one or more displays as the output of an image editing operation and/or to store image data for modified and/or reconstructed images in memory 1210 and/or an external storage device(s), in various embodiments. For example, a graphics application 1220 included in program instructions 1215 may utilize GPU 1240 when modifying, rendering, or displaying images in some embodiments.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations described herein may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:
1. A system, comprising:
one or more processors; and a memory coupled to the one or more processors and storing program instructions executable by the one or more processors to implement:

dividing an input image into a plurality of patches in accordance with a regular grid;

for each of the plurality of patches:

determining a set of candidate patches from among the plurality of patches for placing adjacent to the patch, wherein the set of candidate patches comprises less than all of the plurality of patches; and for each candidate patch:

determining one or more groupings of compatible neighbor patches for the candidate patch, wherein each grouping comprises the candidate patch and one or more other patches, and wherein the patches in each grouping are compatible with each other when placed in a particular spatial configuration with respect to the candidate patch and each other; and for each of one or more of the one or more groupings:

storing active labels identifying the compatible neighbor patches that are included in the determined grouping; and subsequent to said storing, performing an image editing operation on the input image to produce an output image, wherein the location of at least some of the plurality of patches within the output image is dependent on the stored active labels.

2. The system of claim 1, wherein at least some of the plurality of patches are overlapping patches.

3. The system of claim 2, wherein said determining a set of candidate patches comprises identifying a given number of patches most compatible with the patch along a most similar seam when overlapping the patch.

4. The system of claim 1, wherein said determining a set of candidate patches is dependent on local evidence associated with the patch.

5. The system of claim 4, wherein said determining a set of candidate patches comprises identifying a given number of patches most compatible with the local evidence.

6. The system of claim 4, wherein the local evidence comprises one or more of: a color value dependent on color values of pixels in the patch, an intensity value dependent on intensity values of pixels in the patch, user input indicating a desired location for the patch in the output image, user input indicating that the patch is to be removed from the output image, or a value indicating strength of a constraint.

7. The system of claim 1, wherein said performing an image editing operation comprises computing a joint probability of active label assignments for nodes of the output image using belief propagation.

8. The system of claim 7, wherein said performing an image editing operation comprises, for each patch, placing one of the candidate patches adjacent to the patch in the output image such that the joint probability of active label assignments is maximized.

9. The system of claim 7, wherein said computing a joint probability comprises computing an exclusivity term usable to give preference to active label assignments for which duplication of any of the plurality of patches in the output image is minimized.

10. The system of claim 1, wherein said performing an image editing operation on the input image comprises one or more of: adding a patch to the image, relocating a patch within the image, removing a patch from the image, filling a hole in the image resulting from relocation of a patch, or filling a hole in the image resulting from removal of a patch.

11. The system of claim 1, wherein said storing active labels comprises storing identifiers of the compatible neighbor patches in a linked list associated with the candidate patch.

12. The system of claim 1, wherein the one or more processors comprise at least one of: a general-purpose central processing unit (CPU) and a graphics processing unit (GPU).

13. A non-transitory computer-readable storage medium, storing program instructions computer-executable to implement:

dividing an input image into a plurality of patches in accordance with a regular grid;

for each of the plurality of patches:

determining a set of candidate patches from among the plurality of patches for placing adjacent to the patch, wherein the set of candidate patches comprises less than all of the plurality of patches; and for each candidate patch:

determining one or more groupings of compatible neighbor patches for the candidate patch, wherein each grouping comprises the candidate patch and one or more other patches, and wherein the patches in each grouping are compatible with each other when placed in a particular spatial configuration with respect to the candidate patch and each other; and for each of one or more of the one or more groupings:

storing active labels identifying the compatible neighbor patches that are included in the determined grouping; and subsequent to said storing, performing an image editing operation on the input image to produce an output image, wherein the location of at least some of the plurality of patches within the output image is dependent on the stored active labels.

14. The storage medium of claim 13, wherein at least some of the plurality of patches are overlapping patches.

15. The storage medium of claim 14, wherein said determining a set of candidate patches comprises identifying a given number of patches most compatible with the patch along a most similar seam when overlapping the patch.

16. The storage medium of claim 13, wherein said determining a set of candidate patches comprises identifying a given number of patches most compatible with local evidence associated with the patch.

17. The storage medium of claim 16, wherein the local evidence comprises one or more of: a color value dependent on color values of pixels in the patch, an intensity value dependent on intensity values of pixels in the patch, user input indicating a desired location for the patch in the output image, user input indicating that the patch is to be removed from the output image, or a value indicating strength of a constraint.

18. The storage medium of claim 13, wherein said performing an image editing operation comprises computing a joint probability of active label assignments for nodes of the output image using belief propagation.

19. The storage medium of claim 18, wherein said performing an image editing operation comprises, for each patch, placing one of the candidate patches adjacent to the patch in the output image such that the joint probability of active label assignments is maximized.

20. The storage medium of claim 18, wherein said computing a joint probability comprises computing an exclusivity term usable to give preference to active label assignments for which duplication of any of the plurality of patches in the output image is minimized.

21. The storage medium of claim 13, wherein said performing an image editing operation on the input image comprises one or more of: adding a patch to the image, relocating a patch within the image, removing a patch from the image, filling a hole in the image resulting from relocation of a patch, or filling a hole in the image resulting from removal of a patch.

22. The storage medium of claim 13, wherein said storing active labels comprises storing identifiers of the compatible neighbor patches in a linked list associated with the candidate patch.

23. A computer-implemented method, comprising:
dividing an input image into a plurality of patches in accordance with a regular grid;
for each of the plurality of patches:
  determining a set of candidate patches from among the plurality of patches for placing adjacent to the patch, wherein the set of candidate patches comprises less than all of the plurality of patches; and
  for each candidate patch:
    determining one or more groupings of compatible neighbor patches for the candidate patch, wherein each grouping comprises the candidate patch and one or more other patches, and wherein the patches in each grouping are compatible with each other when placed in a particular spatial configuration with respect to the candidate patch and each other; and
    for each of one or more of the one or more groupings:
      storing active labels identifying the compatible neighbor patches that are included in the determined grouping; and
subsequent to said storing, performing an image editing operation on the input image to produce an output image, wherein the location of at least some of the plurality of patches within the output image is dependent on the stored active labels.

24. The method of claim 23, wherein at least some of the plurality of patches are overlapping patches.

25. The method of claim 24, wherein said determining a set of candidate patches comprises identifying a given number of patches most compatible with the patch along a most similar seam when overlapping the patch.

26. The method of claim 23, wherein said determining a set of candidate patches comprises identifying a given number of patches most compatible with local evidence associated with the patch.

27. The method of claim 26, wherein the local evidence comprises one or more of: a color value dependent on color values of pixels in the patch, an intensity value dependent on intensity values of pixels in the patch, user input indicating a desired location for the patch in the output image, user input indicating that the patch is to be removed from the output image, or a value indicating strength of a constraint.

28. The method of claim 23, wherein said performing an image editing operation comprises computing a joint probability of active label assignments for nodes of the output image using belief propagation.

29. The method of claim 28, wherein said performing an image editing operation comprises, for each patch, placing one of the candidate patches adjacent to the patch in the output image such that the joint probability of active label assignments is maximized.

30. The method of claim 28, wherein said computing a joint probability comprises computing an exclusivity term usable to give preference to active label assignments for which duplication of any of the plurality of patches in the output image is minimized.

31. The method of claim 23, wherein said performing an image editing operation on the input image comprises one or more of: adding a patch to the image, relocating a patch within the image, removing a patch from the image, filling a hole in the image resulting from relocation of a patch, or filling a hole in the image resulting from removal of a patch.

32. The method of claim 23, wherein said storing active labels comprises storing identifiers of the compatible neighbor patches in a linked list associated with the candidate patch.

33. A computer-implemented method, comprising:
executing instructions on a specific apparatus so that binary digital electronic signals representing an input image are divided into a plurality of patches in accordance with a regular grid;
for each of the plurality of patches:
  executing instructions on said specific apparatus to determine a set of candidate patches from among the plurality of patches for placing adjacent to the patch, wherein the set of candidate patches comprises less than all of the plurality of patches; and
  for each candidate patch:
    executing instructions on said specific apparatus to determine one or more groupings of compatible neighbor patches for the candidate patch, wherein each grouping comprises the candidate patch and one or more other patches, and wherein the patches in each grouping are compatible with each other when placed in a particular spatial configuration with respect to the candidate patch and each other; and
    for each of one or more of the one or more groupings:
      storing binary digital electronic signals representing active labels identifying the compatible neighbor patches that are included in the determined grouping in a memory location on said specific apparatus;
subsequent to said storing, executing instructions on said specific apparatus so that an image editing operation is performed on the binary digital electronic signals representing the input image to produce binary digital electronic signals representing an output image, wherein the location of at least some of the plurality of patches within the output image is dependent on the binary digital electronic signals representing the stored active labels; and
storing the binary digital electronic signals representing the output image in a memory location of said specific apparatus.

* * * * *